(12) United States Patent
Yamane et al.

(10) Patent No.: US 6,484,815 B1
(45) Date of Patent: Nov. 26, 2002

(54) IMPACT GENERATOR

(75) Inventors: Yoshiro Yamane, Akashi (JP);
Kazuhiko Takemoto, Kakogawa (JP);
Tadao Yashirodai, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 09/553,777

(22) Filed: Apr. 21, 2000

(30) Foreign Application Priority Data

Apr. 26, 1999 (JP) ............................................ 11-118605

(51) Int. Cl.⁷ .............................................. A01G 23/00
(52) U.S. Cl. ...................... 173/205; 173/114; 173/122; 173/171
(58) Field of Search ................................ 173/205, 122, 173/109, 94, 128, 124, 15, 114, 121, 171

(56) References Cited

U.S. PATENT DOCUMENTS

| 363,911 A | * | 5/1887 | Register ...................... 173/94 |
| 4,601,350 A | * | 7/1986 | Mikiya ........................ 173/122 |
| 5,488,997 A | * | 2/1996 | Yamada ........................ 173/94 |
| 5,513,709 A | * | 5/1996 | Fisher ......................... 173/205 |
| 5,845,719 A | * | 12/1998 | Matsumoto et al. ......... 173/205 |
| 6,192,995 B1 | * | 2/2001 | Yamada ....................... 173/15 |

FOREIGN PATENT DOCUMENTS

| JP | 2-100884 | 4/1990 |
| JP | SHO 10 13519 | 7/1994 |
| JP | 7-095827 | 11/1995 |

* cited by examiner

*Primary Examiner*—Scott A. Smith
(74) *Attorney, Agent, or Firm*—Oppenheimer Wolff & Donnelly LLP

(57) ABSTRACT

In a conventional impact generator, a grease receives centrifugal force by the rotation of a rotary member, thereby keeping away from surfaces of the rotary member and a weight. Consequently, insufficient lubrication is caused between the weight and a member (for example, a tappet and the like) which comes in contact with the weight. An impact generator D comprises an impregnating member 60 capable of impregnating the grease. The impregnating member 60 is extended from a vicinity of an inner peripheral wall surface 59 of a chamber E1 for accommodating a rotary member 10 and a weight 30 to a position where the impregnating member 60 comes in contact with the weight 30 performing a circular motion.

3 Claims, 8 Drawing Sheets

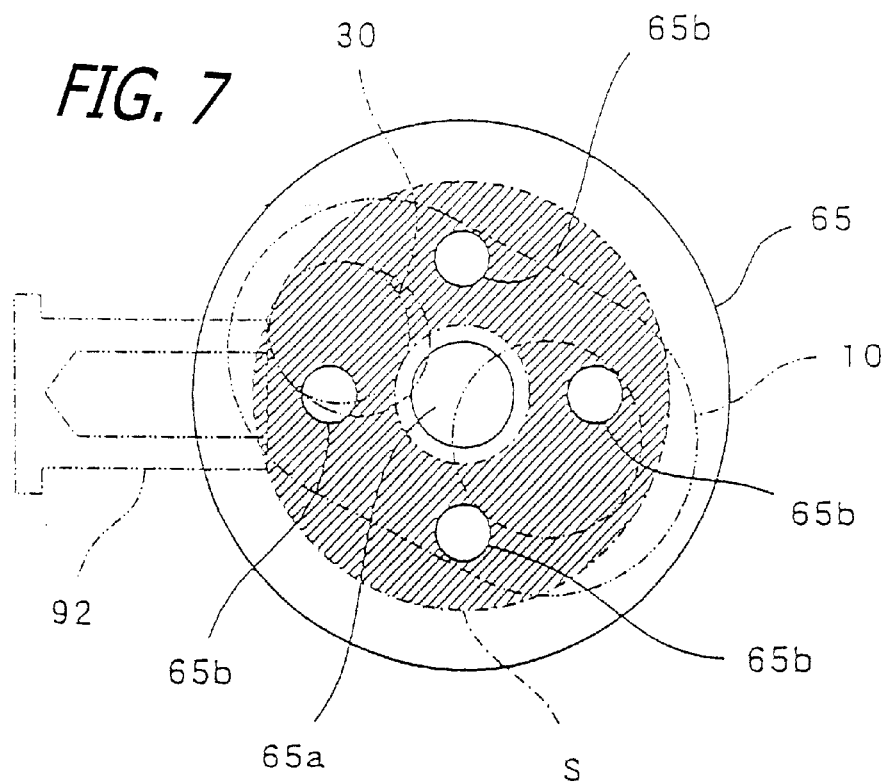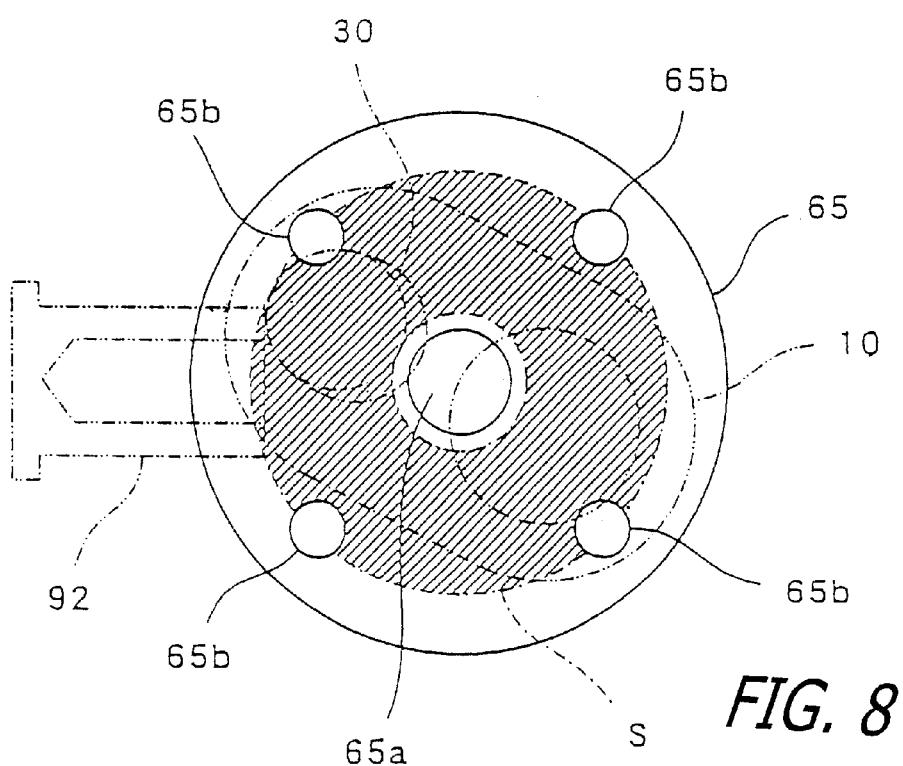

IMPACT GENERATOR

BACKGROUND OF THE INVENTION

1. Field of the Invention

The invention relates to an impact generator for rotating a weight by means of a rotary member and striking a struck member with the weight, thereby continuously generating impact force for working.

2. Description of the Related Art

An impact generator is a device for continuously generating impact, force (shock force). Such impact generator may be applied to a crusher for crushing concrete or hardened asphalt in a road construction, a building site and the like, a reaper for cutting off fruit and branches of plants, and a root cutter for cutting off roots of plants and the like, for example.

By way of example, Japanese Laid-Open Patent Publication No. Hei 7-95827 has disclosed an impact generator according to the prior art. FIG. 10A is a transverse sectional view showing the impact generator D100 according to the prior art and FIG. 10B is a longitudinal sectional view showing the impact generator D100. The impact generator D100 is applied to a reaper and serves to give continuous impact force to a cutting blade 191. The impact generator D100 converts rotating force transmitted from a power unit such as an engine into reciprocating impact force and transmits the reciprocating impact force to the cutting blade 191.

As shown in FIGS. 10A and 10B the impact generator D100 comprises a rotary member 110 and a weight 130. The rotary member 110 is rotatably supported in a casing 150 by means of rotary shafts 111 and 112. The rotary member 110 has plate-shaped holding portions 113 and 114. The plate-shaped holding portions 113 and 114 are connected to each other through a connecting shaft portion 115. The connecting shaft portion 115 is positioned eccentrically from the center C100 of rotation of the rotary member 110. Circular holes 113a and 114a are formed on the plate-shaped holding portions 113 and 114, respectively. A cylindrical weight 130 is held in the holes 113a and 114a. The holes 113a and 114a have diameters which are larger than the diameter of the weight 130. Therefore, the weight 130 can freely move to some extent in the holes 113a and 114a. More specifically, the weight 130 is movably held by the rotary member 110.

When the weight 130 performs a circular motion around the rotary shafts 111 and 112 of the rotary member 110 by the rotation of the rotary member 110, the top of a tappet 192 positioned to interfere with the locus of the circular motion is struck with the weight 130. The tappet 192 is supported movably in an axial direction thereof (in a transverse direction in FIGS. 10A and 10B). Therefore, the tappet 192 is struck, thereby giving an impact to the cutting blade 191 positioned on the left of the tappet 192 in FIGS. 10A and 10B. Thus, when the rotary member 110 is rotated, continuous impact force is given to the cutting blade 191.

Disk-shaped plates 165 and 166 are provided in the casing 150. The plates 165 and 166 are provided in contact with upper and lower end faces of the weight 130, thereby regulating a vertical position of the weight 130 which performs the circular motion.

In the impact generator D100 described above, the tappet 192 is repeatedly struck with the weight 130. Accordingly, if the lubrication of contact faces of the weight 130 and the tappet 192 is not well maintained, the contact faces are greatly worn. In order to keep the lubrication of the contact faces well maintained, it is preferable that a grease should be caused to adhere to the contact faces. Moreover, the weight 130 is caused to slide on the internal wall surfaces of the holes 113a and 114a of the rotary member 110. In order to keep the slide on such wall surfaces well maintained, it is preferable that the grease should be caused to adhere to the weight 130 and the rotary member 110. Furthermore, the weight 130 performs a circular motion while coming in contact with the plates 165 and 166 for regulating the vertical position thereof. Therefore, it is necessary to keep the lubrication well maintained here as well by causing the grease to adhere to portions between the weight 130 and the plates 165 and 166.

However, when the rotary member 110 is rotated, the grease receives centrifugal force and gradually moves away from the center C100 of rotation of the rotary member 110. Therefore, the grease starts to keep away from the surfaces of the rotary member 110 and the weight 130 and to be collected on an inner peripheral wall surface 159 of the casing 150. Consequently, the lubrication on the contact faces of the weight 130 and the tappet 192 becomes poor. Thus, the contact faces are greatly worn. Moreover, insufficient lubrication is caused between the weight 130 and the rotary member 110, the plate 165 and the like.

SUMMARY OF THE INVENTION

In consideration of above-mentioned circumstance, it is an object of the invention to provide an impact generator capable of keeping good lubrication of a weight and other members which come in contact with the weight.

In order to solve the above-mentioned problems, the invention provides an impact generator comprising a rotary member for being rotated upon receipt of rotating force, a weight movably held by the rotary member for striking a struck member, and an impregnating member capable of impregnating a grease, wherein the impregnating member is extended from a vicinity of an inner peripheral wall surface of a chamber for accommodating the rotary member and the weight to a position where the impregnating member comes in contact with the weight performing a circular motion.

According to the impact generator described above, the grease reaching the inner peripheral wall surface of the chamber by centrifugal force is absorbed in the impregnating member. The weight comes in contact with the impregnating member while performing the circular motion. Therefore, the grease absorbed in the impregnating member adheres to the surface of the weight. Accordingly, the lubrication of the weight and other members which come in contact with the weight can always be kept well maintained.

In the above-mentioned impact generator, if the impregnating member is constituted to come in contact with a portion of the weight's face which abuts against the struck member, the grease supplied from the impregnating member can directly be applied to the face of the weight which abuts against the struck member.

In the above-mentioned impact generator, the impregnating member may be formed of any material which can impregnate the grease. For example, the impregnating member may be formed of felt.

In order to solve the above-mentioned problem, furthermore, the invention provides another impact generator comprising a rotary member for being rotated upon receipt of rotating force, a weight movably held by the rotary member for striking a struck member, gears for transmitting the rotating force from a power unit to the rotary member, a casing for accommodating the rotary member, the weight and the gears, and a separating plate for separating an internal space of the casing into a first chamber for accommodating the rotary member and the weight and a second chamber for accommodating the gears, and coming in contact with the weight to regulate a position of the weight, wherein at least one communicating portion for causing the first chamber to communicate with the second chamber is formed on the separating plate.

According to the impact generator described above, if the grease is put in the second chamber, it can move to the first chamber through the communicating portion. Accordingly, a surface of the weight in the first chamber can always be kept in a state in which the grease adheres thereto. Thus, the lubrication of the weight and other members which come in contact with the weight can always be kept well maintained.

In the above-mentioned impact generator, if the communicating portion is included in or interferes with a portion of the separating plate's face with which the weight comes in contact, the grease passing through the communicating hole first adheres to the weight and then enters a clearance between the weight and the separating plate. Accordingly, the lubrication of the weight and the separating plate can particularly be kept well maintained.

In the above-mentioned impact generator, the communicating portion for causing the first chamber to communicate with the second chamber-can be formed in any way. For example, the communicating portion may be a hole.

These objects as well as other objects, features and advantages of the invention will become more apparent to those skilled in the art from the following description with reference to the accompanying drawings.

BRIEF DESCRIPTION OF THE DRAWINGS

FIG. 7 is a plan view of a separating plate, illustrating a portion of the separating plate's face with which the weight comes in contact;

FIG. 8 is a plan view of a separating plate, illustrating the portion of the separating plate's face with which the weight comes in contact;

DETAILED DESCRIPTION OF THE PREFERRED EMBODIMENT

An embodiment of the invention will be described below with reference to the drawings.

Figure 1:
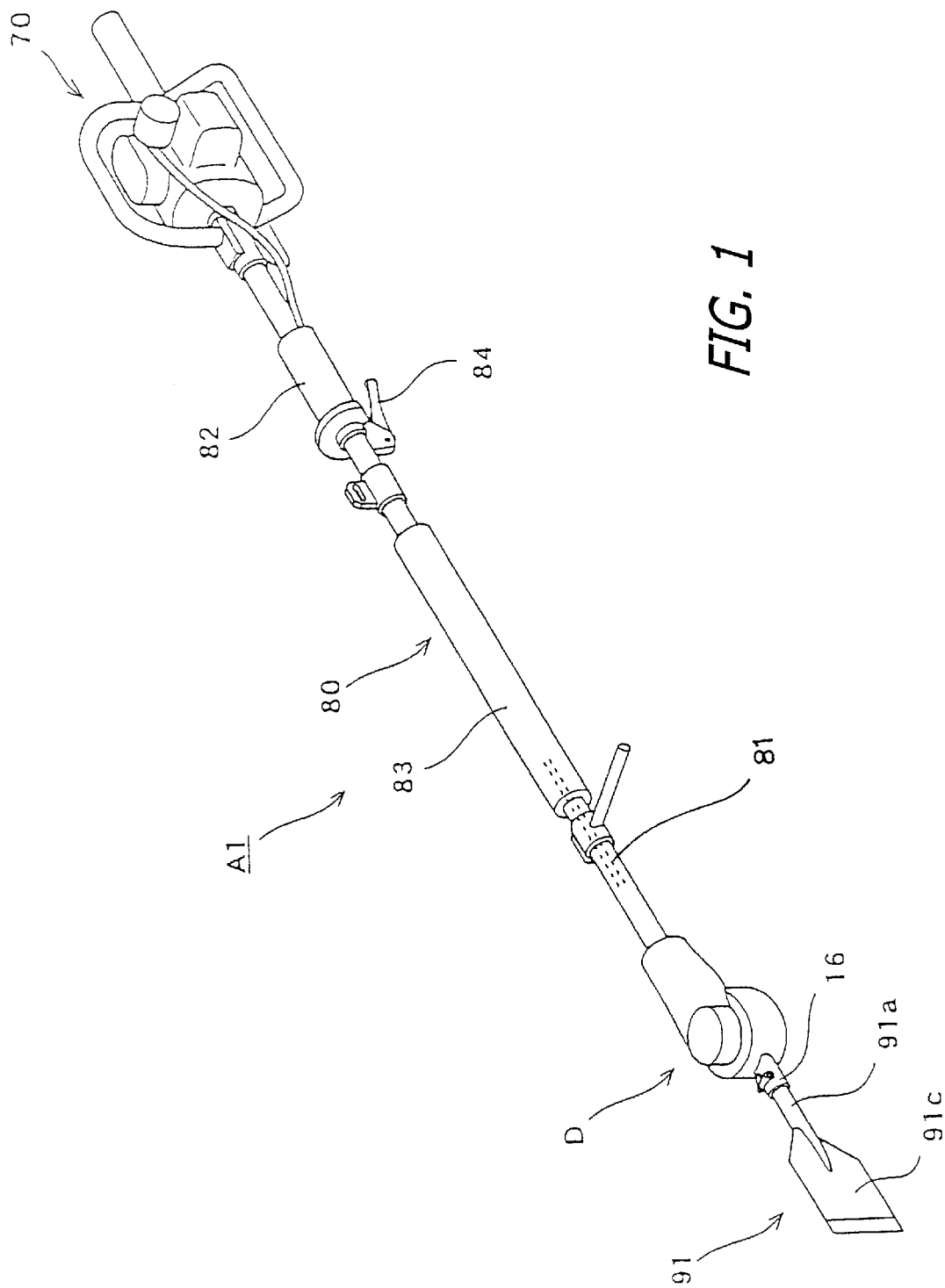
FIG. 1 is a perspective view showing a reaper.

An impact generator according to the invention can be applied to a reaper, a root cutter, a crusher and the like, for example. FIG. 1 is a perspective view showing a reaper A1. An impact generator D according to an embodiment of the invention is applied to the reaper A1.

First of all, the basic structure of the reaper A1 will be described with reference to FIG. 1. The reaper A1 comprises an engine 70 acting as a power unit, a rod member 80, the impact generator D, a cutting blade 91, and the like.

The engine 70 generates rotating force.

The rod member 80 connects the engine 70 to the impact generator D. The rod member 80 is constituted by a hollow pipe in which a drive shaft 81 penetrates. The rotating force generated by the engine 70 is transmitted to the impact generator D by the drive shaft 81 penetrating the rod member 80.

The impact generator D converts the rotating force generated by the engine 70 into continuous striking force (impact force) of reciprocating.

The cutting blade 91 is formed by welding a plate-shaped blade portion 91c to a shank portion 91a. The shank portion 91a is inserted into a blade attaching portion 16 of the impact generator D. The shank portion 91a is attached to the blade attaching portion 16 such that it can be displaced in the longitudinal direction of the reaper Al by a predetermined length. The shank portion 91a receives a periodic impact by the striking force generated by the impact generator D through a tappet 92 (refer FIGS. 3A and 3B). The impact is directed from the shank portion 91a toward the edge of the plate-shaped blade portion 91c.

A first grip portion 82 and a second grip portion 83 are formed in the rod member 80 of the reaper Al, and an operation lever 84 is attached adjacently to the first grip portion 82. The operation lever 84 serves to control the speed of the engine 70. The engine 70 and the drive shaft 81 penetrating the rod member 80 are connected to each other through a centrifugal clutch. When the operation lever 84 is released to bring the engine 70 into an idling state, the centrifugal clutch is brought into a disconnecting state so that the rotating force of the engine 70 is not transmitted to the impact generator D. When the operation lever 84 is gripped more tightly, the engine speed of the engine 70 is gradually increased so that the centrifugal clutch is connected. Consequently, the impact generator D starts to give a periodic impact to the shank portion 91a of the cutting blade 91. When the operation amount of the operation lever 84 is further increased, the engine speed of the engine 70 is increased so that an impact cycle is shortened.

Also in the case where the impact generator according to the invention is applied to a root cutter, a basic structure thereof is the same as in the reaper Al.

Figure 2A:
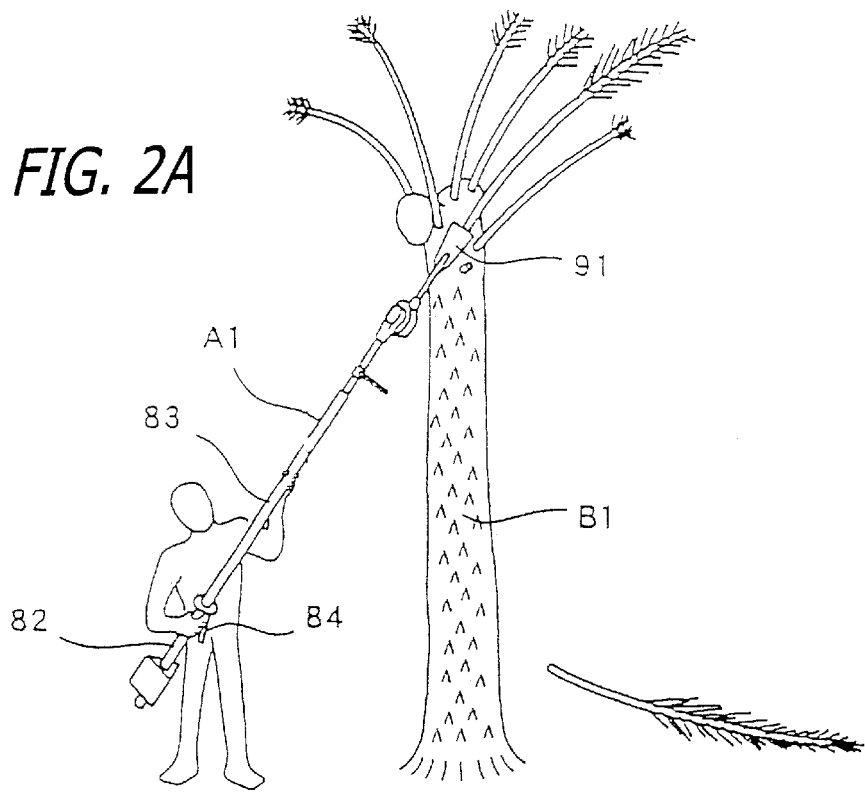
FIG. 2A is a view showing a state in which fruit and branches of an oil palm are cut off by the reaper of FIG. 1.
Figure 2B:
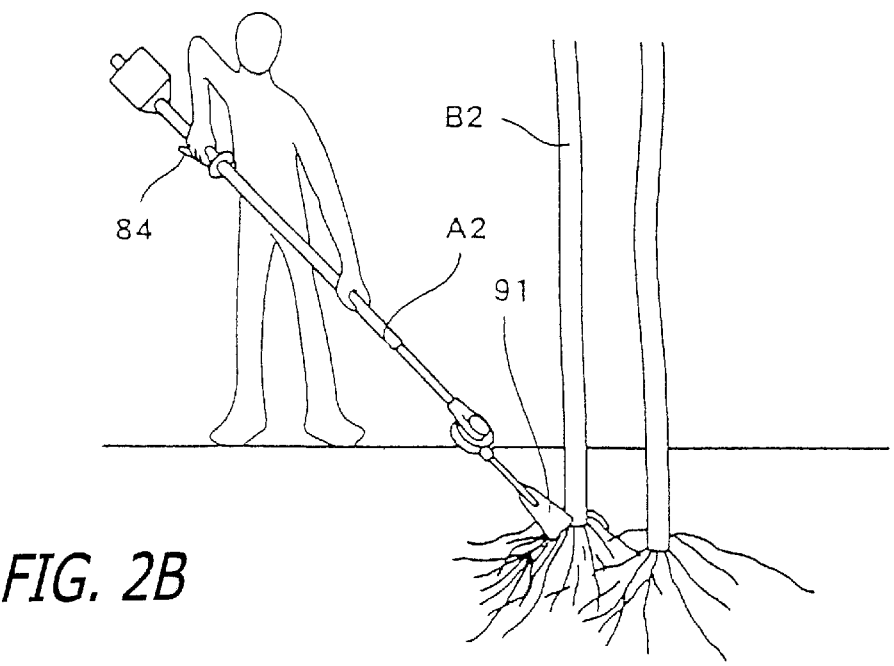
FIG. 2B is a view showing a state in which roots of plants are cut off by the root cutter whose basic structure is the same as the reaper of FIG. 1.

FIG. 2A shows a state in which fruit and branches of an oil palm B1 are cut off by the reaper A1 and FIG. 2B shows a state in which roots of a plant B2 are cut off by means of the root cutter A2.

Referring to FIG. 2A, an operator grips the first and second grip portions 82 and 83 by both hands, thereby supporting the reaper Al. One of the operator's hands operates the operation lever 84 while gripping the first grip portion 82. Then, the operator presses the edge of the cutting blade 91 against the base portion of the branch and the stem portion of the fruit while adjusting an impact cycle by the operation of the operation lever 84, thereby cutting off the branches and the fruits by impact force.

Referring to FIG. 2B, the operator operates the operation lever 84 while supporting the root cutter A2 by both hands. Then, the operator presses the edge of the cutting blade 91 against the root of the plant B2 in the ground while adjusting the impact cycle by the operation of the operation lever 84, thereby cutting off the root by the impact force.

Figures 3A, 3B:
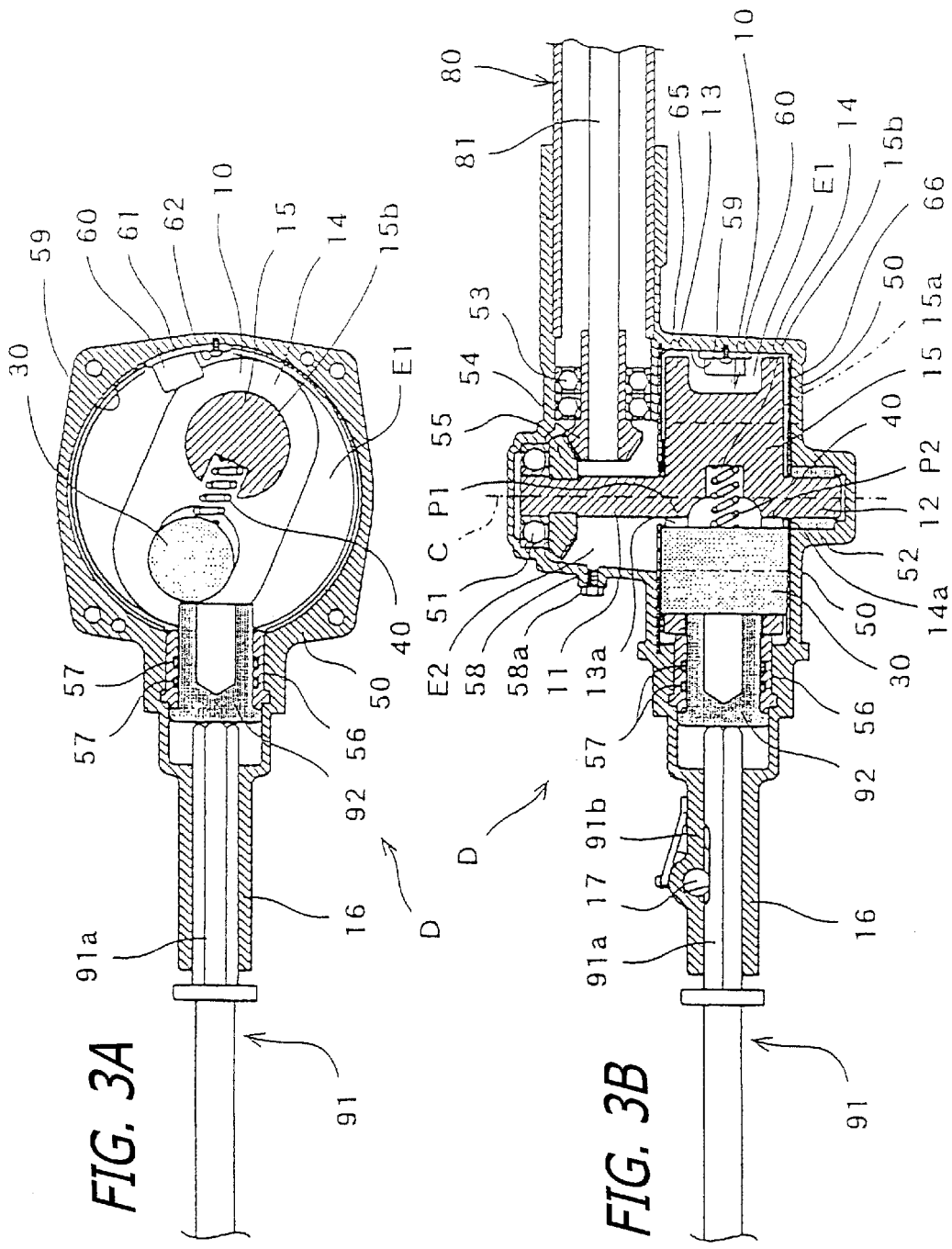
FIG. 3A is a transverse sectional view showing the impact generator.
FIG. 3B is a longitudinal sectional view showing the impact generator.
Figure 4:
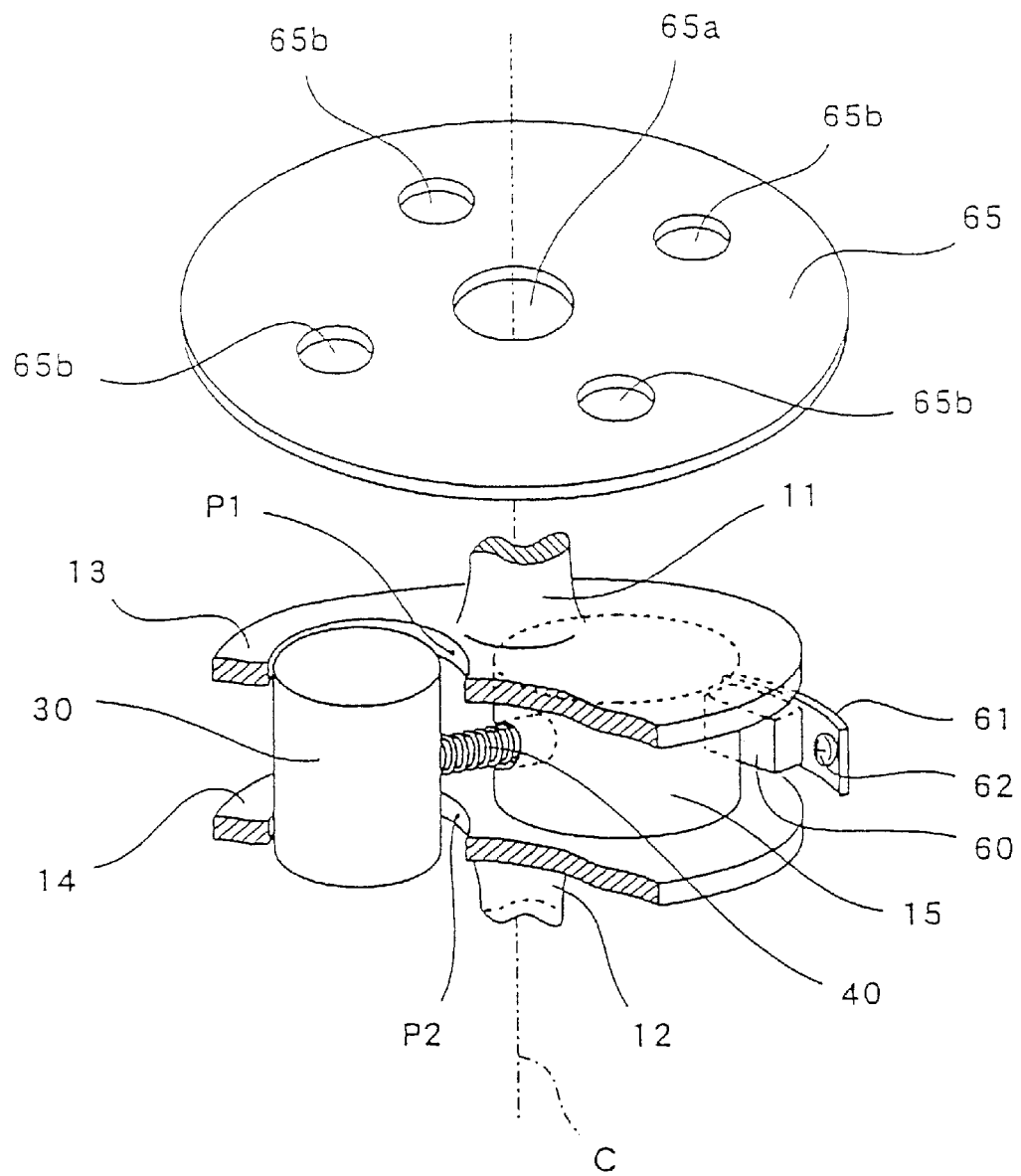
FIG. 4 is an assembly view showing main members of the impact generator of FIGS. 3A and 3B, a part of which is cut away.

FIG. 3A is a transverse sectional view showing the impact generator D and FIG. 3B is a longitudinal sectional view showing the impact generator D. FIG. 4 is an assembly view showing main members of the impact generator D, a part of which is cut away.

The impact generator D comprises a casing 50, a rotary member 10, a weight 30, an impregnating member 60, gears 54 and 55, a separating plate 65 and the like. The rotary member 10, the weight 30, the impregnating member 60, the gears 54 and 55 and the separating plate 65 are accommodated in the casing 50. Furthermore, the cutting blade 91 is attached to the casing 50.

The rotary member 10 is rotatably supported on the casing 50. More specifically, the rotary member 10 has rotary shafts 11 and 12 protruded in a vertical direction. The rotary shafts 11 and 12 are supported on the casing 50 through bearings 51 and 52. The bearing 51 supporting the upper rotary shaft 11 is a ball bearing, and the bearing 52 supporting the lower rotary shaft 12 is a needle bearing.

On the other hand, one of the ends of the drive shaft 81 penetrating the rod member 80 is supported by a ball bearing 53 fixed to the casing 50. The drive shaft 81 transmits the rotating force generated by the engine 70 to the impact generator D. The drive shaft 81 and the rotary shaft 11 are connected to each other through a pair of gears 54 and 55. The gear 54 is a driving gear and the gear 55 is a driven gear. The pair of gears 54 and 55 convert a direction of rotation by about 90 degrees. The rotating force generated by the engine 70 is transmitted to the rotary member 10 through the drive shaft 81 and the gears 54 and 55.

The rotary member 10 has upper and lower plate-shaped holding portions 13 and 14 provided in almost parallel with each other. The upper and lower plate-shaped holding portions 13 and 14 are connected to each other through a cylindrical connecting shaft portion 15. A central axis 15a of the connecting shaft portion 15 is positioned eccentrically from a center C of rotation of the rotary member 10.

Elliptical weight holding holes 13a and 14a are formed in the upper and lower plate-shaped holding portions 13 and 14, respectively. The weight 30 is held in the weight holding holes 13a and 14a. The weight 30 is almost cylindrical and has upper and lower end portions entering in the weight holding holes 13a and 14a, respectively. The weight holding holes 13a and 14a have diameters which are larger than the diameter of the weight 30. Therefore, the weight 30 can freely move to some extent in the weight holding holes 13a and 14a. More specifically, the weight 30 is movably held by the rotary member 10. The weight 30 performs a circular motion around the center C of rotation of the rotary member 10 by the rotation of the rotary member 10. The connecting shaft portion 15 has the function of acting as a balance weight for the weight 30 to perform a circular motion as well as the function of connecting the upper and lower plate-shaped holding portions 13 and 14.

A coil spring 40 acting as a shock absorber is provided between the weight 30 and the rotary member 10. A supporting hole 15b is formed in the connecting shaft portion 15, and one of ends of the coil spring 40 is fitted in the supporting hole 15b. Thus, the coil spring 40 is fixed to the connecting shaft portion 15. The other end of the coil spring 40 abuts against a side face of the weight 30.

The separating plate 65 and a bottom plate 66 are provided in the casing 50. These plates 65 and 66 have the function of regulating the vertical position of the weight 30 which performs a circular motion in FIGS. 3A and 3B. More specifically, the weight 30 is movably held in the weight holding holes 13a and 14a which have larger diameters than the diameter of the weight 30. In order to prevent the weight 30 from getting out of the weight holding holes 13a and 14a, it is necessary to use members for regulating the position of the weight 30 in a vertical direction. The weight 30 performs the circular motion with upper and lower end faces thereof in contact with the separating plate 65 and the bottom plate 66, respectively.

The separating plate 65 has the function of separating an internal space of the casing 50 into a first chamber E1 and a second chamber E2 as well as the function of regulating the position of the weight 30. The rotary member 10, the weight 30 and the like are accommodated in the first chamber E1, and the gears 54 and 55 and the like are accommodated in the second chamber E2.

The separating plate 65 has an almost circular profile. A central hole 65a and four communicating holes 65b acting as communicating portions are formed on the separating plate 65. The central hole 65a serves to cause the rotary shaft 11 to penetrate therethrough, and has a diameter which is slightly larger than the diameter of the rotary shaft 11. The communicating hole 65b serves to cause the first chamber E1 to communicate with the second chamber E2. The first chamber E1 is caused to communicate with the second chamber E2 through the communicating hole 65b so that the grease in the second chamber E2 can move to the first chamber E1.

More specifically, the grease is put in the first chamber E1 and the second chamber E2. The grease in the first chamber E1 mainly serves to keep the lubrication of contact faces of the weight 30 and the tappet 92, the lubrication of the side face of the weight 30 and internal wall surfaces of the weight holding holes 13a and 14a of the rotary member 10, the lubrication of the upper end face of the weight 30 and the separating plate 65, and the lubrication of the lower end face of the weight 30 and the bottom plate 66. The grease in the second chamber E2 mainly serves to keep the lubrication of the gears 54 and 55. The amount of the grease put in the casing 50 takes about 10% to about 20% of capacities of both the first chamber E1 and the second chamber E2.

A grease injection port 58 is formed in the casing 50, and serves to supply the grease into the casing 50 when the amount of the grease in the casing 50 is decreased. The grease injection port 58 is blocked with a plug 58a when the grease is not injected.

The impregnating member 60 is attached to an inner peripheral wall surface 59 of the first chamber E1. The impregnating member 60 may be formed of any material which can impregnate the grease, and is formed of felt in the embodiment. The impregnating member 60 is attached to the inner peripheral wall surface 59 of the first chamber E1 with a screw 62 through an attaching bracket 61.

The tappet 92 acting as a struck member is accommodated in the casing 50 in such a manner that it can move in the axial direction thereof (in a right and left direction of FIGS. 3A and 3B). The struck member serves to directly receive striking force (impact force) from the weight 30 by the collision with the weight 30. The tappet 92 is supported on a bush 56 fixed into the casing 50. A portion between the bush 56 and the tappet 92 is sealed by an O ring 57 in order to prevent the grease in the casing 50 from leaking out. The casing 50 has the blade attaching portion 16 for attaching the cutting blade 91 thereto. The blade attaching portion 16 has an attaching hole in which the shank portion 91*a* of the cutting blade 91 is inserted. A notch portion 91*b* is formed on a side face of the shank portion 91*a*. The blade attaching portion 16 is provided with a clamp 17. The clamp 17 is engaged with the notch portion 91*b* for fixation. The cutting blade 91 can reciprocate in the axial direction thereof (in the right and left direction of FIGS. 3A and 3B) within a range in which the clamp 17 can interfere with the notch portion 91*b*. More specifically, the clamp 17 has the function of preventing the cutting blade 91 from coming off and the function of regulating the range of the reciprocation of the cutting blade 91. The tappet 92 interferes with the locus of the circular motion of the weight 30 when it is set in a rightmost position of FIGS. 3A and 3B within the moving range. Moreover, the tappet 92 does not interfere with the locus of the circular motion of the weight 30 when it is set in a leftmost position of FIGS. 3A and 3B within the moving range. Thus, the tappet 92 can reciprocate between an interference position where it interferes with the locus of the circular motion of the weight 30 and a noninterference position where it does not interfere with the locus of the circular motion of the weight 30.

In the impact generator D having the above-mentioned structure, when the rotary member 10 is rotated by the rotation of the drive shaft 81, the weight 30 held by the rotary member 10 is forced to the offside (outside) of the weight holding holes 13*a* and 14*a* (on the side distant from the center of rotation of the rotary member 10 and the left side in FIGS. 3A and 3B) by centrifugal force and the force of the coil spring 40, and performs a circular motion around the center C of rotation of the rotary member 10 in this state. When the weight 30 disposed at the offside of the weight holding holes 13*a* and 14*a* collides with the tappet 92 set in the interference position to strike the tappet 92 in the direction toward the noninterference position (to the left in FIGS. 3A and 3B), the tappet 92 gives an impact to the cutting blade 91. The cutting blade 91 and the tappet 92 try to move integrally in the direction toward the noninterference position. The weight 30 is repelled in the direction toward the center C of rotation in the weight holding holes 13*a* and 14*a* upon receipt of a reaction from the tappet 92. Consequently, the coil spring 40 is contracted to absorb shock force generated between the weight 30 and the rotary member 10. The weight 30 repelled by the reaction of the tappet 92 collides with points P1 and P2 on the internal walls defining the weight holding holes 13*a* and 14*a* which are the closest to the center C of rotation. The shock received by the rotary member 10 during the collision is relieved by the coil spring 40.

When the tappet 92 is struck, the cutting blade 91 gives impact force to the branches of the plants and the like which are positioned on an edge thereof and are objects for working. By the cutting blade 91 is pressed against the objects for working or receives a reaction from the objects for working, the cutting blade 91 is then pushed back to the right in FIGS. 3A and 3B. The tappet 92 moves to the interference position again and is then struck with the weight 30 which has taken a round. Thus, the striking force is continuously given to the tappet 92.

Figure 5:
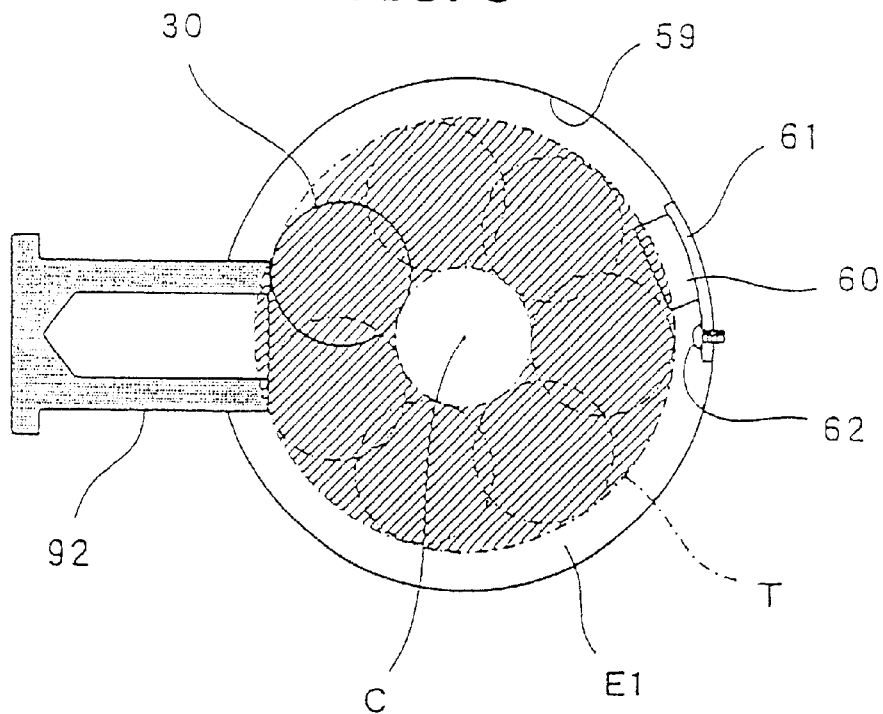
FIG. 5 is a view illustrating the locus of a circular motion of a weight which overlaps with a transverse sectional view showing a first chamber.

FIG. 5 is a view illustrating a locus T of the circular motion of the weight 30 which overlaps with a transverse sectional view showing the first chamber E1. In FIG. 5, an oblique line part represents the locus T.

When the rotary member 10 is rotated so that the weight 30 performs a circular motion, the grease adhering to the rotary member 10 and the weight 30 receives centrifugal force and gradually moves to a position distant from the center C of the rotation of the rotary member 10. Then, the grease reaches the inner peripheral wall surface 59 of the first chamber E1. The grease which has reached the inner peripheral wall surface 59 of the first chamber E1 is absorbed by the impregnating member 60. A rear end of the impregnating member 60 is positioned in the vicinity of the inner peripheral wall surface 59 of the first chamber E1. A tip of the impregnating member 60 is positioned within the locus T of the circular motion of the weight 30. Accordingly, the weight 30 causes the side face thereof to come in contact with the tip of the impregnating member 60 while performing the circular motion. Consequently, the grease absorbed by the impregnating member 60 adheres to the side face of the weight 30. Thus, the grease which has moved from the surface of the weight 30 to the inner peripheral wall surface 59 of the first chamber E1 by the centrifugal force adheres to the surface of the weight 30 again. Accordingly, the surface of the weight 30 is always kept in a state in which the grease adheres thereto. Therefore, the lubrication of contact faces of the weight 30 and the tappet 92 can always be kept well maintained. Consequently, the contact faces will be less worn. As is apparent from FIG. 3B, the impregnating member 60 is attached into the casing 50 at almost the same level in the vertical direction of FIG. 3B as the tappet 92 in the embodiment. Therefore, the grease supplied from the impregnating member 60 is directly applied onto a portion of the face of the weight 30 which abuts against the tappet 92. Accordingly, the impregnating member 60 is particularly effective in the lubrication of the weight 30 and the tappet 92. Moreover, the surface of the weight 30 is always kept in the state in which the grease adheres thereto. Therefore, the lubrication of the weight 30 and the rotary member 10, the lubrication of the weight 30 and the separating plate 65, and the lubrication of the weight 30 and the bottom plate 66 can also be kept well maintained.

The tip of the impregnating member 60 does not always need to be positioned within the locus T of the circular motion of the weight 30 but it is sufficient that the tip is in contact with the locus T.

Figure 6:
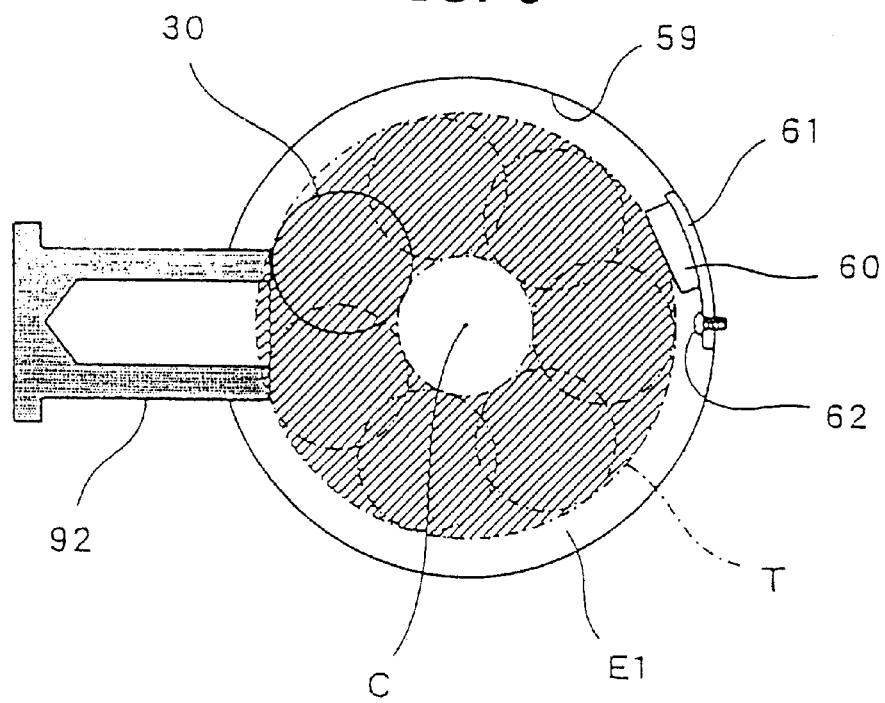
FIG. 6 is a view illustrating the locus of the circular motion of the weight which overlaps with the transverse sectional view showing the first chamber.

FIG. 6 is a view illustrating the locus T of the circular motion of the weight 30 which overlaps with the transverse sectional view showing the first chamber E1. In this case, the tip of the impregnating member 60 is constituted to be in contact with the locus T of the circular motion of the weight 30. Thus, even if the tip of the impregnating member 60 comes in contact with the locus T of the circular motion of the weight 30, the side face of the weight 30 can come in contact with the tip of the impregnating member 60 when the weight 30 performs the circular motion. Consequently, the grease absorbed by the impregnating member 60 can be caused to adhere to the side face of the weight 30. Thus, the lubrication of the weight 30 and other members (the tappet 92, the rotary member 10, the separating plate 65 and the bottom plate 66) which come in contact with the weight 30 can be kept well.

Referring to FIGS. 3A and 3B again, the portion between the bush 56 and the tappet 92 is sealed with the O ring 57, thereby preventing the grease from leaking out therefrom. However, it is hard for the O ring 57 to completely prevent the grease from leaking out. By using the impact generator D for a long time, the grease in the first chamber E1 gradually leaks out to the outside. However, the communicating holes 65b are formed on the separating plate 65 according to the embodiment (see FIG. 4), and the grease in the second chamber E2 is supplied to the first chamber E1 through the communicating holes 65b. Accordingly, even if the impact generator D is used for a long time, the lubrication of the weight 30 and other members (the tappet 92, the rotary member 10, the separating plate 65 and the bottom plate 66) which come in contact with the weight 30 can be kept well maintained.

FIG. 7 is a plan view of the separating plate 65, illustrating a portion S of the face of the separating plate 65 with which the weight 30 comes in contact. In FIG. 7, an oblique line part represents the portion S of the face of the separating plate 65 with which the weight 30 comes in contact. As is apparent from FIG. 7, the portion S of the separating plate 65 with which the weight 30 comes in contact includes the communicating holes 65b. In other words, the communicating holes 65b are constituted to interfere overall with the portion S. Accordingly, the grease passing through the communicating holes 65b first adheres to the upper end face of the weight 30. The grease gradually enters a clearance between the weight 30 and the separating plate 65 according to the circular motion of the weight 30. In the embodiment, therefore, the lubrication of the weight 30 and the separating plate 65 can particularly be kept well maintained.

The grease has a certain degree of viscosity. Therefore, when the rotary member 10 is not rotated, the grease rarely moves through the communicating holes 65b. When the rotary member 10 is rotated, the grease in the communicating holes 65b is drawn by the grease adhering to the upper end face of the weight 30. Consequently, the movement of the grease from the second chamber E2 to the first chamber E1 is promoted. However, the grease has high viscosity. Therefore, the amount of the grease in the second chamber E2 is not rapidly decreased.

In the case where the amount of the grease in the second chamber E2 is decreased due to the movement of the grease from the second chamber E2 to the first chamber E1, it is preferred that the grease should be supplied through the grease injection port 58 (see FIG. 3B).

Moreover, the bottom plate 66 is provided on the bottom of the first chamber E1. Therefore, the grease is collected on a surface of the bottom plate 66 by the action of gravity. Accordingly, the lubrication of the lower end face of the weight 30 and the bottom plate 66 can be kept well maintained.

In order to cause the grease passing through the communicating holes 65b to easily adhere to the upper end face of the weight 30, it is not always necessary that the portion S of the face the separating plate 65 with which the weight 30 comes in contact includes the communicating holes 65b.

FIG. 8 is a plan view of the separating plate 65, illustrating the portion S of the face of the separating plate 65 with which the weight 30 comes in contact. In this case, the communicating holes 65b are constituted to interfere partially with the portion S. Even if the communicating holes 65b are thus constituted to interfere partially with the portion S of the face of the separating plate 65 with which the weight 30 comes in contact, the grease passing through the communicating holes 65b first adheres to the upper end face of the weight 30. Accordingly, the lubrication of the weight 30 and the separating plate 65 can particularly be kept well.

Figure 9A:
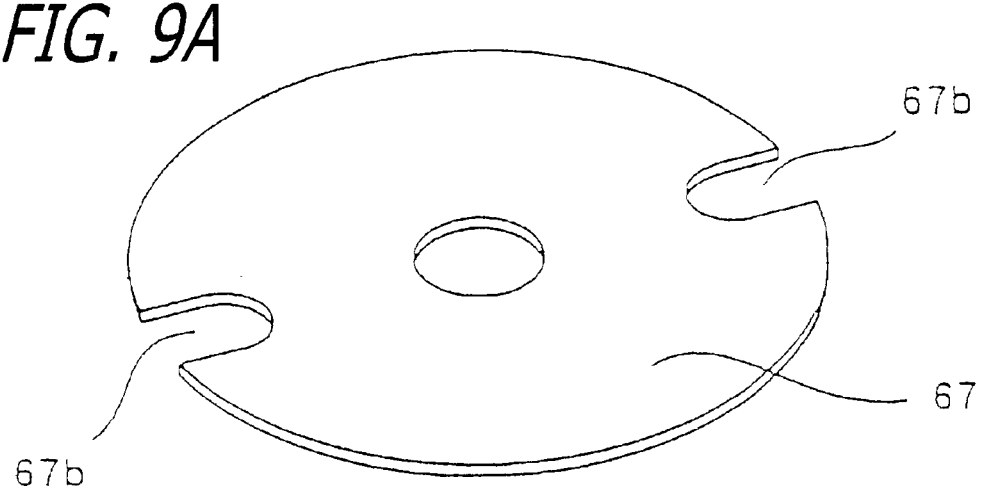
FIG. 9A is a view showing a separating plate according to another embodiment in which notch portions on a peripheral edge acts as communicating portions.
Figure 9B:
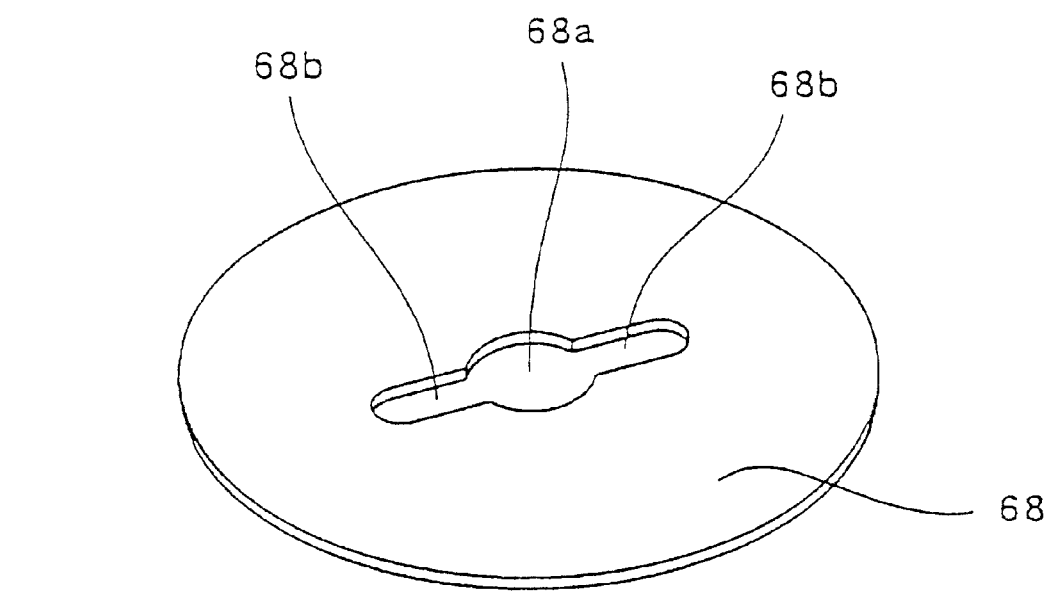
FIG. 9B is a view showing a separating plate according to a further embodiment in which slit-shaped communicating portions are formed in radial directions from a central hole.
Figure 10A:
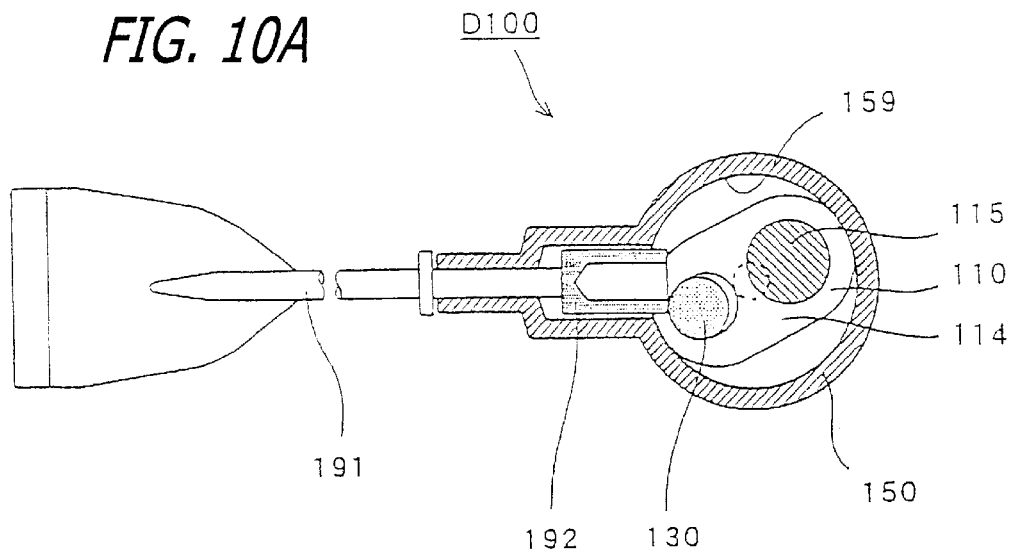
FIG. 10A is a transverse sectional view showing an impact generator according to the prior art.
Figure 10B:
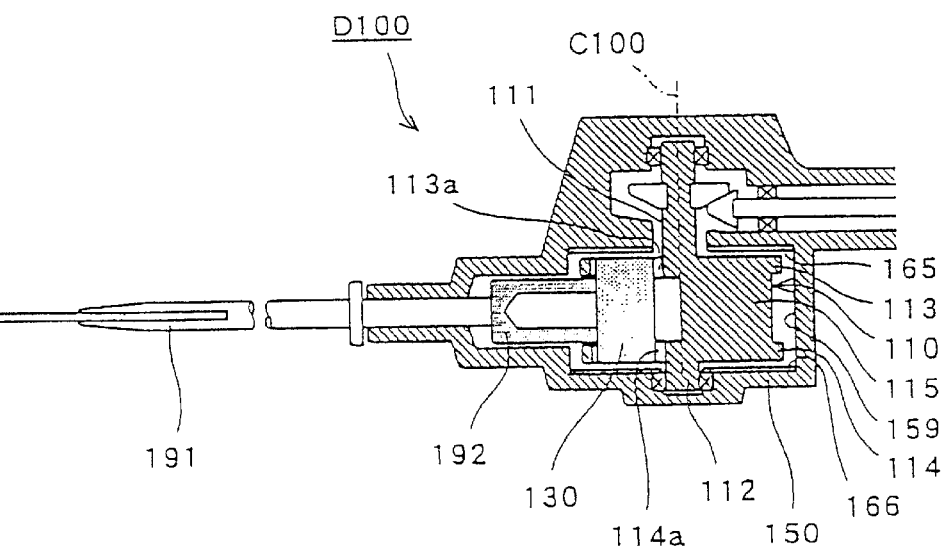
FIG. 10B is a longitudinal sectional view showing the impact generator according to the prior art.

FIG. 9A is a perspective view showing a separating plate 67 according to another embodiment. The separating plate 67 has notch portions 67b on a peripheral edge as communicating portions. FIG. 9B is a perspective view showing a separating plate 68 according to a further embodiment. The separating plate 68 has slit-shaped communicating portions 68b formed in radial directions from a central hole 68a. Such communicating portions can cause the first chamber E1 to communicate with the second chamber E2. Therefore, the grease can be supplied from the second chamber E2 to the first chamber E1.

Numerous modifications and alternative embodiments of the invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. An impact generator comprising:
   a rotary member for being rotated upon receipt of rotating force;
   a weight movably held by the rotary member for performing a circular motion for striking a struck member; and
   an impregnating member capable of impregnating a grease,
   wherein the impregnating member is extended from a vicinity of an inner peripheral wall surface of a chamber for accommodating the rotary member and the weight to a position where the impregnating member comes in contact with the weight performing a circular motion.

2. The impact generator according to claim 1, wherein the impregnating member is constituted to come in contact with a portion of the weight's face which abuts against the struck member.

3. The impact generator according to claim 1, wherein the impregnating member is formed of felt.

* * * * *

UNITED STATES PATENT AND TRADEMARK OFFICE
CERTIFICATE OF CORRECTION

PATENT NO.    : 6,484,815 B1                                           Page 1 of 1
DATED         : November 26, 2002
INVENTOR(S)   : Yushiro Yamane et al.

It is certified that error appears in the above-identified patent and that said Letters Patent is hereby corrected as shown below:

<u>Title page,</u>
Item [30], Foreign Application Priority Data, should read:
-- April 26, 1999  (JP) ............... 11-118616 --

Signed and Sealed this

Fifteenth Day of April, 2003

JAMES E. ROGAN
*Director of the United States Patent and Trademark Office*